(12) United States Patent
Venkatachalam Jayaraman et al.

(10) Patent No.: US 9,148,623 B2
(45) Date of Patent: Sep. 29, 2015

(54) APPARATUS AND METHODS FOR MODEM ASSISTED VIDEO TELEPHONY

(71) Applicant: QUALCOMM Incorporated, San Diego, CA (US)

(72) Inventors: Venkata Ramanan Venkatachalam Jayaraman, Del Mar, CA (US); Rohit Kapoor, San Diego, CA (US); Rashid Ahmed Akbar Attar, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/095,041

(22) Filed: Dec. 3, 2013

(65) Prior Publication Data

US 2014/0362160 A1    Dec. 11, 2014

Related U.S. Application Data

(60) Provisional application No. 61/833,535, filed on Jun. 11, 2013.

(51) Int. Cl.
  *H04N 7/14*      (2006.01)
  *H04W 28/02*    (2009.01)
  *H04L 12/811*   (2013.01)
  *H04L 12/801*   (2013.01)
  *H04L 12/825*   (2013.01)
  *H04W 28/20*    (2009.01)

(52) U.S. Cl.
  CPC ............... *H04N 7/141* (2013.01); *H04L 47/14* (2013.01); *H04L 47/25* (2013.01); *H04L 47/38* (2013.01); *H04W 28/0205* (2013.01); *H04W 28/0236* (2013.01); *H04W 28/20* (2013.01)

(58) Field of Classification Search
  CPC ......... H04N 7/141; H04N 7/147; H04N 7/15; H04L 47/38; H04W 28/20
  USPC ................................. 348/14.02, 14.01, 14.12
  See application file for complete search history.

(56) References Cited

U.S. PATENT DOCUMENTS

2012/0092991 A1* 4/2012 Jeong et al. .................... 370/235
2012/0250762 A1* 10/2012 Kaye et al. ............... 375/240.07
2013/0057639 A1* 3/2013 Ralston ....................... 348/14.02
2013/0222515 A1* 8/2013 Abuan et al. ............... 348/14.01

OTHER PUBLICATIONS

International Search Report and Written Opinion—PCT/US2014/040819—ISA/EPO—Nov. 10, 2014.

* cited by examiner

*Primary Examiner* — Stella L Woo
(74) *Attorney, Agent, or Firm* — Loza & Loza LLP

(57) ABSTRACT

Aspects of the present disclosure provide an apparatus and method for modem-assisted video telephony. As one example, a user equipment (UE) utilizes a modem to perform video telephony (VT) communication with a remote device through a wireless network. The UE determines a network metric indicative of congestion in the wireless network based on modem information obtained from the modem, independent of feedback information received from the remote device. The UE dynamically adjusts a data rate of the VT communication by an amount proportional to a quantity based on the network metric.

28 Claims, 12 Drawing Sheets

APPARATUS AND METHODS FOR MODEM ASSISTED VIDEO TELEPHONY

CROSS-REFERENCE TO RELATED APPLICATION

This application claims priority to and the benefit of provisional patent application No. 61/833,535 filed in the United States Patent Office on 11 Jun. 2013, the entire content of which is incorporated herein by reference.

TECHNICAL FIELD

Aspects of the present disclosure relate generally to wireless communication systems, and more specifically, to video telephony in a wireless communication system.

BACKGROUND

Wireless communication networks are widely deployed to provide various communication services such as telephony, video, data, messaging, broadcasts, video telephony, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance wireless communication technologies (e.g., UMTS technologies) not only to meet the growing demand for mobile broadband access, but to advance and enhance the user experience with mobile communications such as improved video telephony.

Due to tight delay constraints, video telephony (VT) applications typically track the bandwidth available in a network to ensure that data rates of the VT applications do not exceed the available bandwidth. VT applications also may monitor the delay from one end of the call to the other (e.g., from one mobile terminal to another mobile terminal). By tracking and controlling the data rate of the VT application, occurrence of disturbances such as frame freezes, drops, and blurs may be reduced. In the related art, VT applications that operate over internet protocol (IP) typically monitor various network metrics such as bandwidth, round-trip time (RTT), jitter at the transport layer (e.g., TCP/UDP) or higher layer, etc. A VT application running at a device relies on the other end of the video call to inform the VT application of the network metrics being monitored. This end-to-end feedback mechanism arrangement introduces an undesirable reaction delay when congestion is detected in a data packet path, especially when the congestion is on the uplink of the sender.

Furthermore, end-to-end feedback mechanisms generally do not indicate how much more bandwidth is available for the video telephony call. When congestion occurs, the data path between the sender and receiver does not provide sufficient uplink and/or downlink bandwidth for transmitting data without causing undesirable effects such as queuing delay and/or packet loss. Lack of congestion simply indicates that bandwidth is available, but no useful information is provided as to how much more bandwidth is available. In wireless communication, tracking the available bandwidth of wireless channels is even more challenging because the available wireless bandwidth is often time-varying. Therefore, due to the lack of available bandwidth information, end-to-end feedback-based rate adaptation algorithms for video communication are unable to aggressively utilize the available bandwidth.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication. The method includes: utilizing a modem of a user equipment to perform video telephony (VT) communication with a remote device through a wireless network; determining a network metric indicative of congestion in the wireless network based on modem information obtained from the modem, independent of feedback information received from the remote device; and dynamically adjusting a data rate of the VT communication by an amount proportional to a quantity based on the network metric.

The determining the network metric may include determining a packet loss of the VT communication based on the modem information, and the method may further include: transmitting an uncompressed video frame in the VT communication in response to the determined packet loss of the VT communication; and configuring a codec of the user equipment such that video frames transmitted subsequent in time to the uncompressed video frame, refrain from referencing video frames transmitted prior to the uncompressed video frame.

Another aspect of the disclosure provides an apparatus for wireless communication. The apparatus includes: means for utilizing a modem of the apparatus to perform video telephony (VT) communication with a remote device through a wireless network; means for determining a network metric indicative of congestion in the wireless network based on modem information obtained from the modem, independent of feedback information received from the remote device; and means for dynamically adjusting a data rate of the VT communication by an amount proportional to a quantity based on the network metric.

Another aspect of the disclosure provides a computer program product, including a computer-readable storage medium that includes code for causing a user equipment to perform various functions. The functions includes: utilizing a modem of the user equipment to perform video telephony (VT) communication with a remote device through a wireless network; determining a network metric indicative of congestion in the wireless network based on modem information obtained from the modem, independent of feedback information received from the remote device; and dynamically adjusting a data rate of the VT communication by an amount proportional to a quantity based on the network metric.

Another aspect of the disclosure provides an apparatus for wireless communication. The apparatus includes at least one processor, a communication interface including a modem coupled to the at least one processor, and a memory coupled to the at least one processor. The at least one processor includes a number of circuitries. A first circuitry is configured to utilize the modem to perform video telephony (VT) communication with a remote device through a wireless network. A second circuitry is configured to determine a network metric indicative of congestion in the wireless network based on modem information obtained from the modem, independent of feedback information received from the remote device. A third circuitry is configured to dynamically adjust a data rate of the VT communication by an amount proportional to a quantity based on the network metric.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide an apparatus and methods that can improve congestion detection and available bandwidth tracking in video telephony (VT) applications, in particular, VT applications in a wireless communications network, e.g., a UMTS network. In various aspects of the disclosure, a user equipment (UE) can utilize modem information to rapidly detect congestion in the network (e.g., a channel between a UE and a Node B) and the available bandwidth without relying on end-to-end feedback between the UE and another network entity (e.g., another UE).

Figure 1:
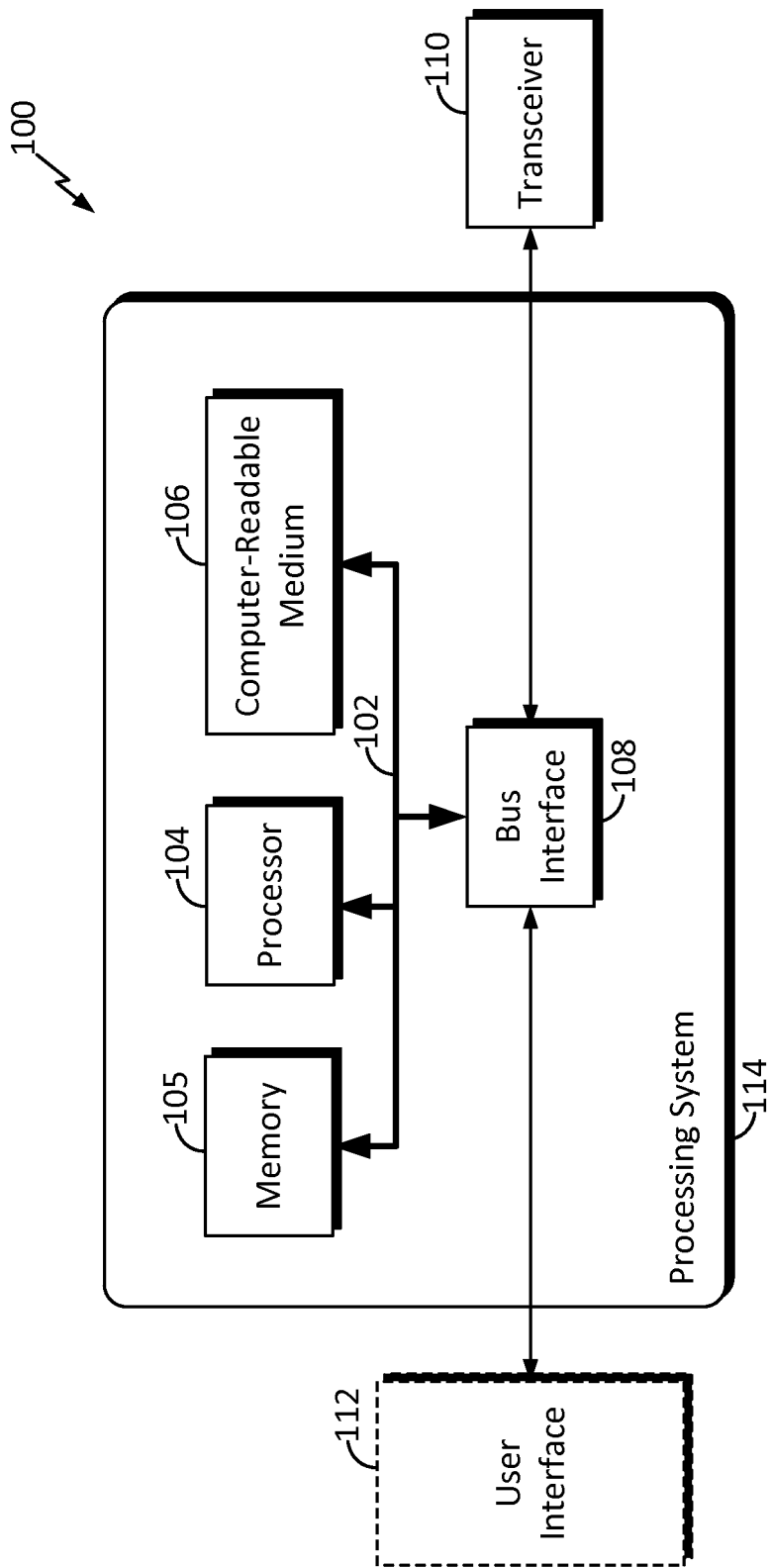
FIG. 1 is a block diagram illustrating an example of a hardware implementation for an apparatus employing a processing system in accordance with an aspect of the disclosure.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, 5-7, and/or 10. In another example, the apparatus 100 may be a Node B or a radio network controller (RNC) as illustrated in any one or more of FIGS. 2, 3 and/or 5. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below and illustrated in FIG. 8.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided. The processor 104 and computer-readable medium 106 will be described in more detail below in exemplary embodiments.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or be distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
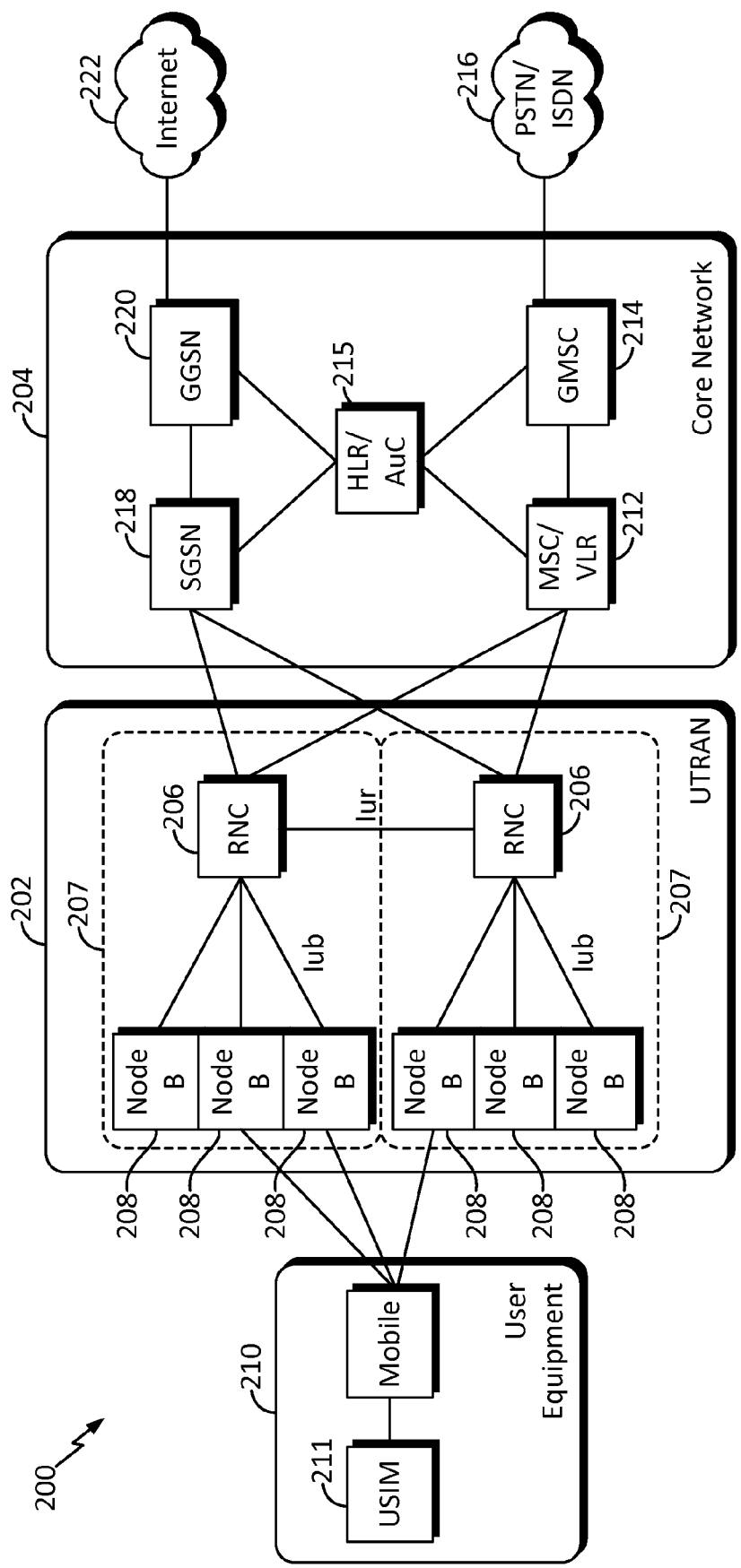
FIG. 2 is a block diagram conceptually illustrating an example of a telecommunications system in accordance with aspects of the disclosure.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. In an aspect of the disclosure, the apparatus 100 may be used as the UE 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207, in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with an MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
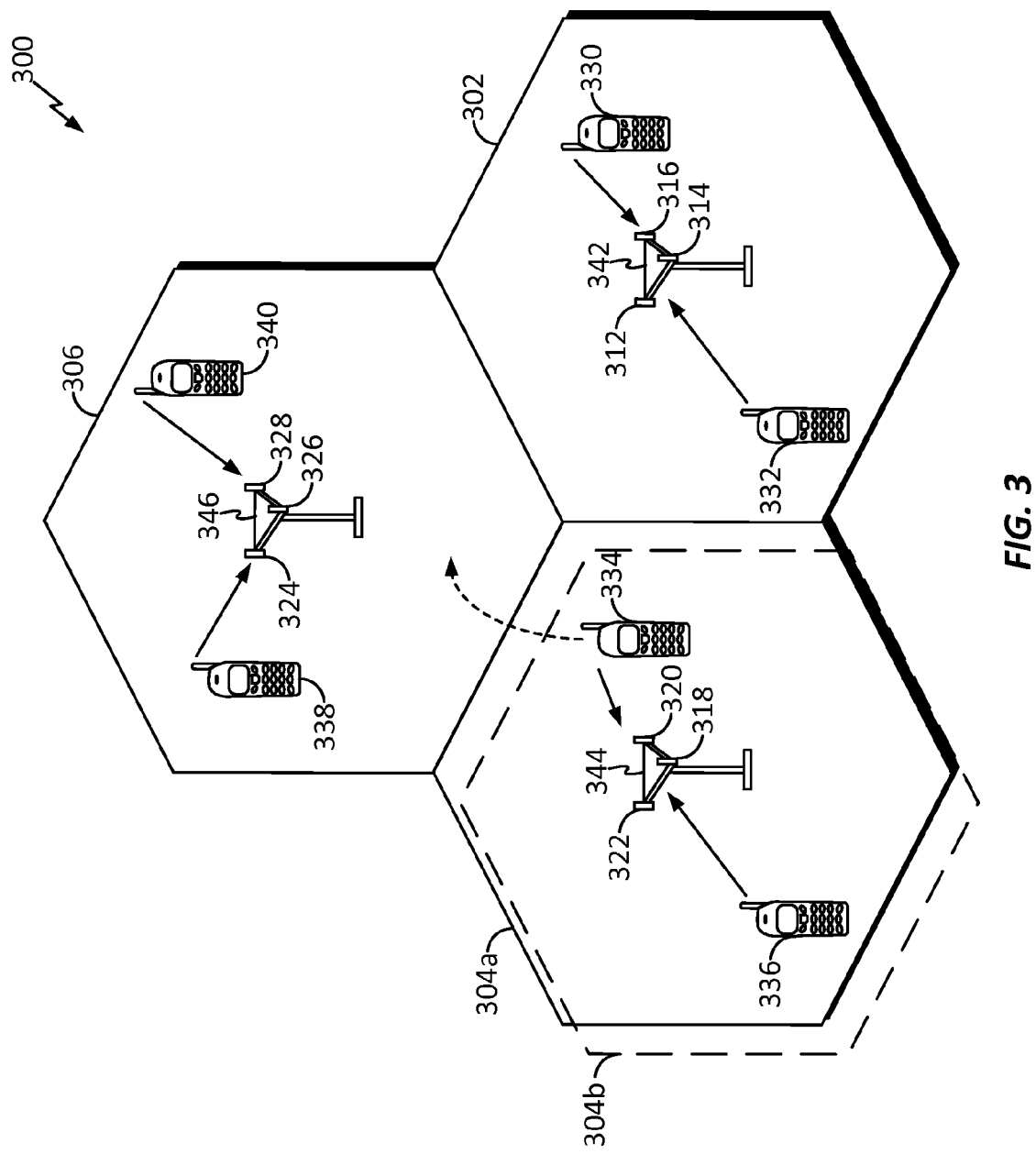
FIG. 3 is a conceptual diagram illustrating an example of a radio access network.

The UTRAN 202 is one example of a RAN that may be utilized in accordance with aspects of the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
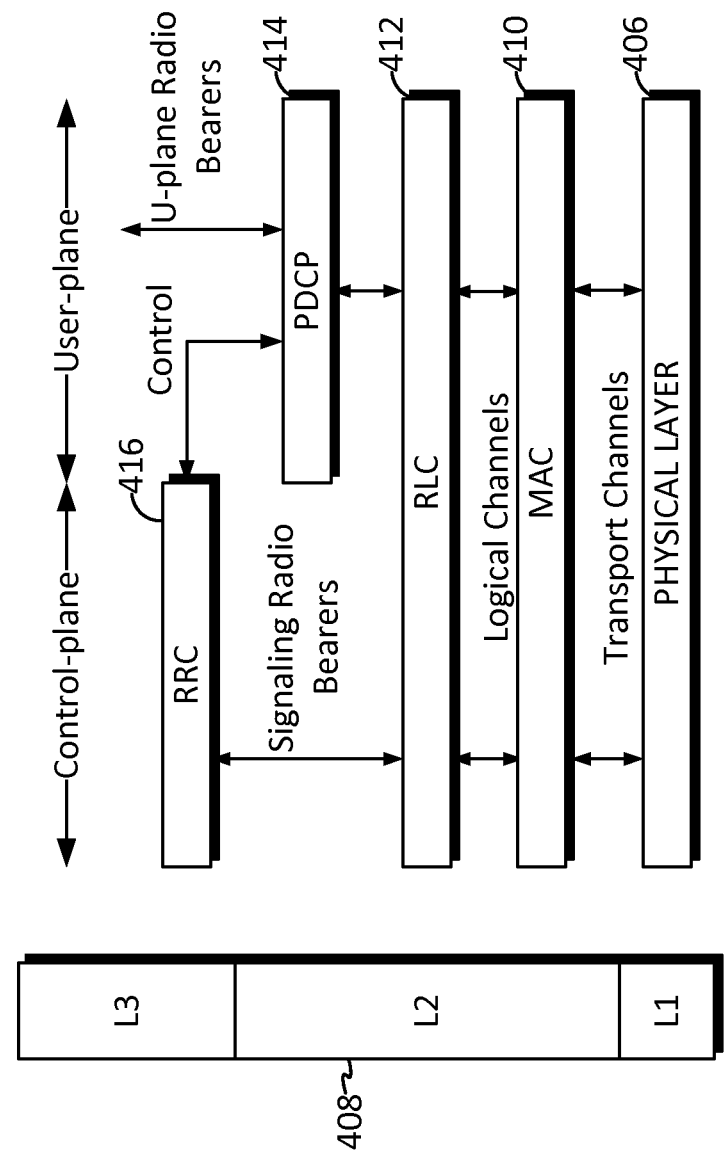
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
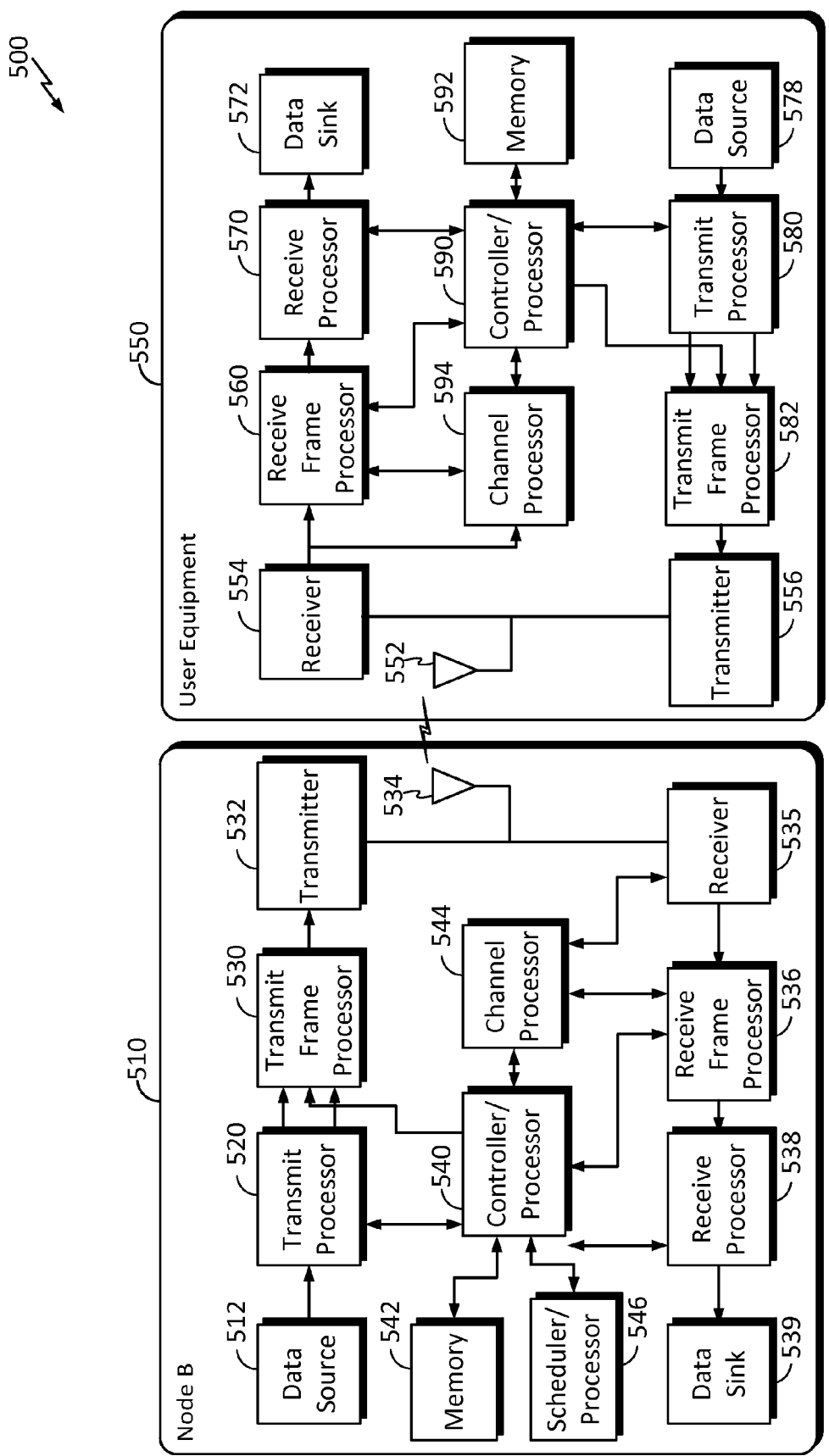
FIG. 5 is a block diagram conceptually illustrating an example of a Node B in communication with a user equipment (UE) in a telecommunications system.

FIG. 5 is a block diagram of an exemplary Node B 510 in communication with an exemplary UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications (e.g., VT applications) running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552. One or more of the above-described blocks in the UE 550 may be referred to as a modem that may be configured for VT communication with another UE.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 6:
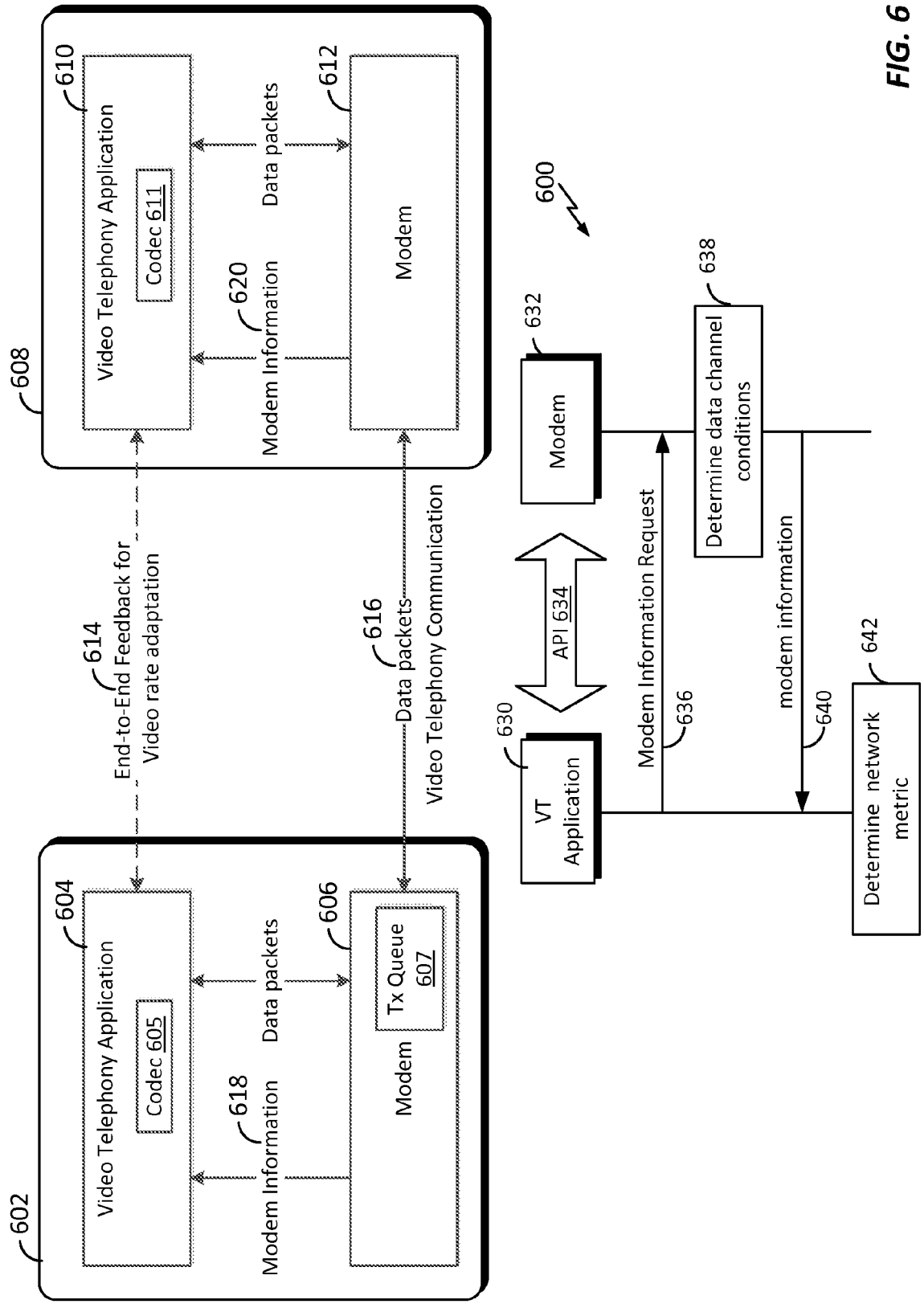
FIG. 6 is a block diagram conceptually illustrating two UEs in video telephony (VT) communication with both UEs utilizing modem information based rate adaptation in accordance with aspects of the present disclosure.

FIG. 6 is a block diagram conceptually illustrating two UEs 602 and 608 in VT communication utilizing modem information based rate adaptation in accordance with aspects of the present disclosure. In an aspect of the disclosure, the UE 602 may be the UE 330, and the UE 608 may be the UE 332 in FIG. 3. The UE 602 includes a video telephony application 604 and a modem 606. The video telephony application 604 may be stored in a suitable storage medium (e.g., a computer-readable medium 106) of the UE 602. In an aspect of the disclosure, the video telephony application 604 includes a video codec 605 for performing decoding and/or encoding of digital video. In some aspects of the disclosure, the video codec 605 may be implemented in software, hardware, or a combination of hardware and software. The UE 608 also includes a video telephony application 610 and a modem 612. Therefore, the UEs 602 and UE 608 may perform VT communication. The video telephony application 610 also includes a video codec 611 that can support the video decoding/encoding scheme used by the video codec 605. In some aspects of the disclosure, the video codec 611 may be implemented in software, hardware, or a combination of hardware and software.

When the UEs 602 and 608 are in VT communication, end-to-end feedback information 614 may be exchanged between the UEs while payload data packets 616 (e.g., video frames) are transferred between the applications 604 and 610 via the modems 606 and 612. Further, the video telephony application 604 receives modem information 618 from the modem 606 such that the video telephony application 604 can detect congestion in the uplink or downlink channel and also determine or estimate the available bandwidth for VT communication, independent of the end-to-end feedback information 614 received from the UE 608.

In an aspect of the disclosure, the modem information 618 may be utilized by the UE to determine a network metric that may include uplink available bandwidth, downlink available bandwidth, packet loss, and uplink queue length, and other useful channel information. In an aspect of the disclosure, the video telephony application 610 also receives modem information 620 (similar to modem information 618) from the modem 612 such that the video telephony application 610 can detect congestion in the uplink or downlink channel and also determine available bandwidth for VT communication from the UE 608's perspective. In an aspect of the disclosure, the UE 602 may transmit the data packets 616 by a wireless uplink channel to the UE 608 via other network entities, such as, but not limited to, one or more base stations or Node Bs (e.g., Node B 208) and one or more RNCs (e.g., RNC 206).

In one aspect of the disclosure, FIG. 6 also illustrates a message flow algorithm 600 between a VT application 630 and a modem 632 at a UE (e.g., UE 602 or 608). The VT application 630 and the modem 632 may communicate with each other over a suitable application program interface (API) 634. The VT application 630 may be the VT application 604 or 610, and the modem 632 may be the modem 606 or 612. The VT application 630 may transmit a modem information request message 636 to the modem 632 over the API 634. An example of a modem API is disclosed in a copending U.S. patent application Ser. No. 14/019,843, and the entire content of this copending application is incorporated herein by reference. In response to the modem information request message 636, the modem 632 may determine the data channel conditions. Then, the modem 632 sends modem information 640 including the data channel conditions to the VT application 630 over the API 634. The modem information 640 may be the modem information 618 or 620. Based on the modem information 640, the UE can determine a network metric 642 that may include uplink available bandwidth, downlink available bandwidth, packet loss, uplink queue length, and other useful data channel information.

Figure 7:
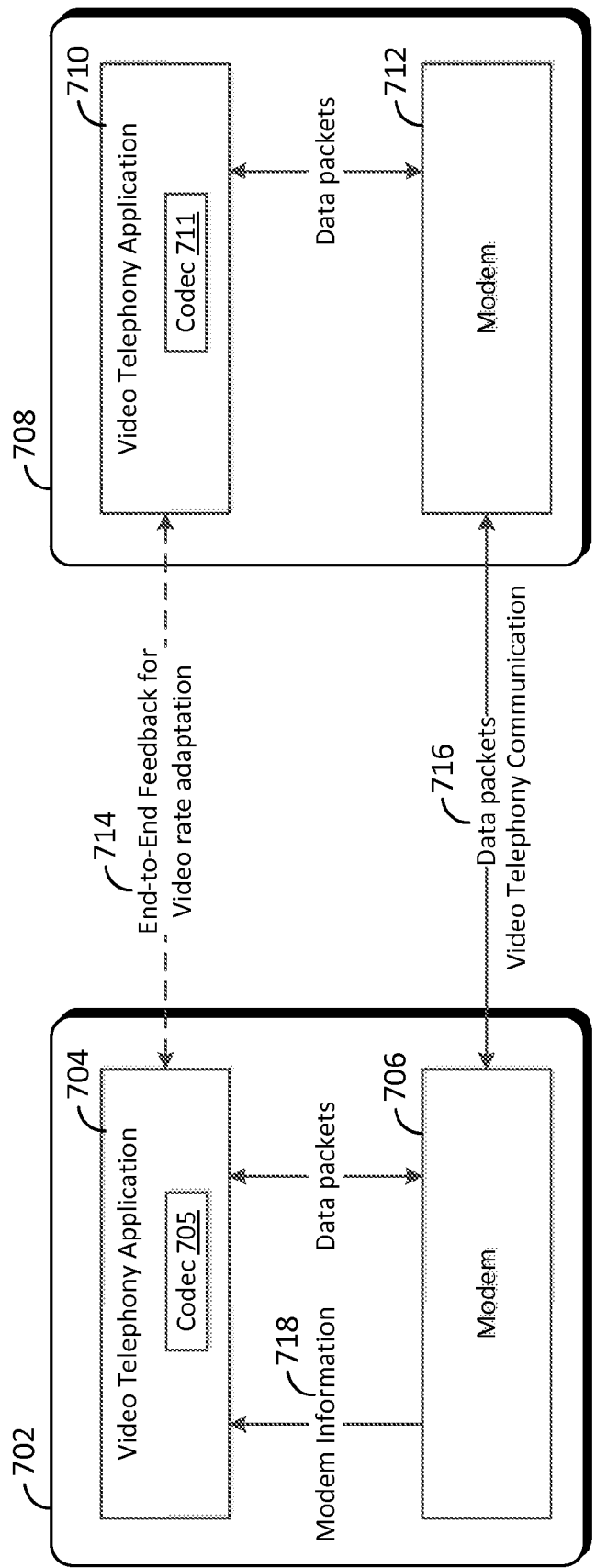
FIG. 7 is a block diagram conceptually illustrating two UEs in VT communication with one UE utilizing modem information based rate adaptation in accordance with aspects of the present disclosure.

FIG. 7 is a block diagram conceptually illustrating two UEs 702 and 708 in VT communication utilizing modem information based rate adaptation in accordance with aspects of the present disclosure. In an aspect of the disclosure, the UE 702 may be the UE 330, and the UE 708 may be the UE 332 in FIG. 3. The UE 702 includes a video telephony application 704 and a modem 706. The video telephony application 704 includes a video codec 705 for performing video encoding and decoding. In some aspects of the disclosure, the video codec 705 may be implemented in software, hardware, or a combination of hardware and software. The UE 702 may be in VT communication with the UE 708, which includes a video telephone application 710 and a modem 712. The video telephony application 710 includes a video codec 711 for decoding and encoding video data. In some aspects of the disclosure, the video codec 711 may be implemented in software, hardware, or a combination of hardware and software, and supports the encoding/decoding scheme used by the video codec 705.

When the UEs 702 and 708 are in VT communication, end-to-end feedback information 714 may be exchanged between the UEs while payload data packets 716 (e.g., video frames) are exchanged between the applications 704 and 710 via the modems 706 and 712. Further, the video telephony application 704 receives modem information 718 from the modem 706 such that the video telephony application 704 can detect congestion in the uplink or downlink and also determine available bandwidth for VT communication, independent of the end-to-end feedback 714 received from the UE 708. In an aspect of the disclosure, the UE 702 may process the modem information 718 to determine a network metric including uplink available bandwidth, downlink available bandwidth, packet loss, uplink queue length, and other useful channel information. In an aspect of the disclosure, the UE 702 may transmit the data packets 716 by a wireless uplink channel to the UE 708 via other network entity, such as, but not limited to, one or more base stations or Node Bs (e.g., Node B 208) and one or more RNC (e.g., RNC 206). In FIG. 7, only one end (UE 702) of the VT communication supports modem feedback based rate adaptation.

Figure 8:
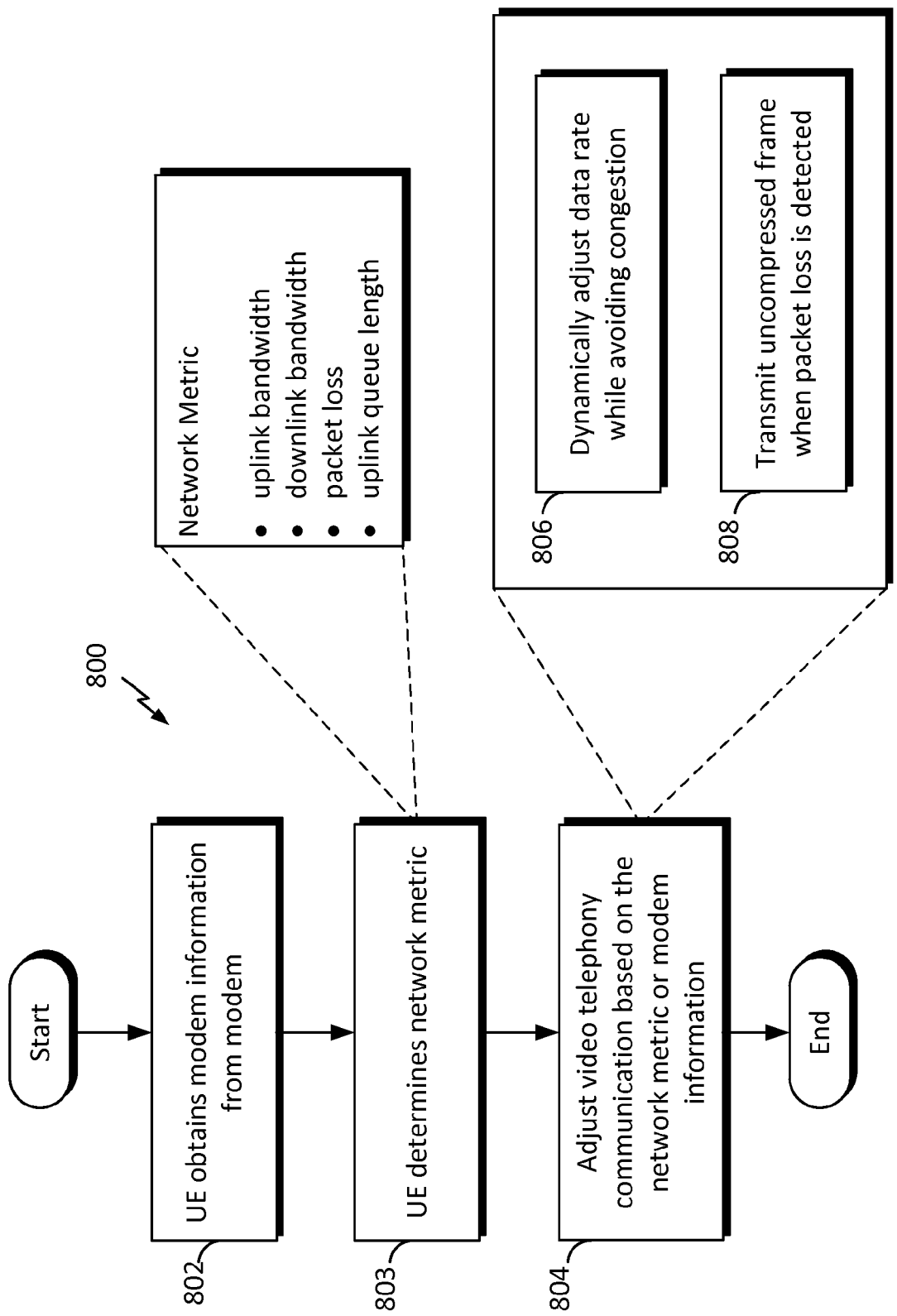
FIG. 8 is a flowchart illustrating modem information based rate adaptation processes in VT communication in accordance with aspects of the disclosure.

FIG. 8 is a flowchart illustrating a modem information based rate adaptation scheme 800 in VT communication in accordance with aspects of the disclosure. By way of example and not limitation, a UE (e.g., UE 602 or 702) is in VT communication with another UE (e.g., UE 608 or 708) via a wireless communication network (e.g., UTRAN 202). During the VT communication, the UE may obtain modem information (e.g., modem information 618 of FIG. 6) from its modem (e.g., modem 606 of FIG. 6) (see block 802). The modem information is independent of the end-to-end feedback information (e.g., information 614 of FIG. 6) received from the other UE. In one aspect of the disclosure, the VT application of the UE may communicate with its modem based on a message flow algorithm 600 illustrated in FIG. 6. Based on the modem information, the UE determines a network metric (e.g., network metric 642) including, but not limited to, uplink bandwidth, downlink bandwidth, packet loss, uplink queue length, etc. (block 803). Then, the UE may adjust a data rate of the VT communication based on the network metric or modem information to avoid congestion or take advantage of available bandwidth (see block 804). In an aspect of the disclosure, the modem information may be processed to determine the network metric including uplink available bandwidth, downlink available bandwidth, packet loss, and uplink queue length.

Packet loss and queue length may be determined in a straightforward manner from the modem. In an aspect of the disclosure, when the modem determines that a packet has not been acknowledged, it may indicate a packet loss in the modem information. In an aspect of the disclosure, the application may request for the uplink queue length from the modem, and the modem may return the amount of bytes sitting in a transmission (Tx) queue (e.g., Tx queue 607 in FIG. 6). The estimation of uplink available bandwidth will be described in more detail below. Based on the network metric, the UE can quickly detect network congestion in the uplink or downlink and also to determine available bandwidth without relying on the end-to-end feedback between the UEs.

Detecting network congestion based on modem information allows for a UE to immediately and rapidly respond to congestion. That is, without using the modem information, the congestion can be detected only upon receiving end-to-end feedback from the other side of the VT call, which could take several tens to hundreds of milliseconds in wireless networks. During this time, the sending UE may be overloading the data path, causing significant queuing which in turn may lead to frame freezes, losses, and other disturbances.

However, in an aspect of the disclosure, the sending UE can determine or estimate available uplink and/or downlink bandwidth using its modem information so as to determine how much the video target rate may be adjusted without causing congestion in the modem or data path. In an aspect of the disclosure, the UE may dynamically adjust a data rate of the VT communication based on a rate difference between a current data rate of the VT communication and an estimated available bandwidth (e.g., maximum uplink data rate) in the wireless network (block 806). In an aspect of the disclosure, the UE may dynamically adjust the VT data rate by an amount proportional to the rate difference (i.e., a quantity of the network metric based on modem information). For example, the sending UE can adjust data rate conservatively (e.g., increase data rate by small increments) when its current data rate is close to the available bandwidth, and adjust data rate aggressively (e.g., increase data rate by large increments) when its current rate is far below the available bandwidth. Accordingly, the wireless link may be utilized in a more efficient manner.

Figure 9:
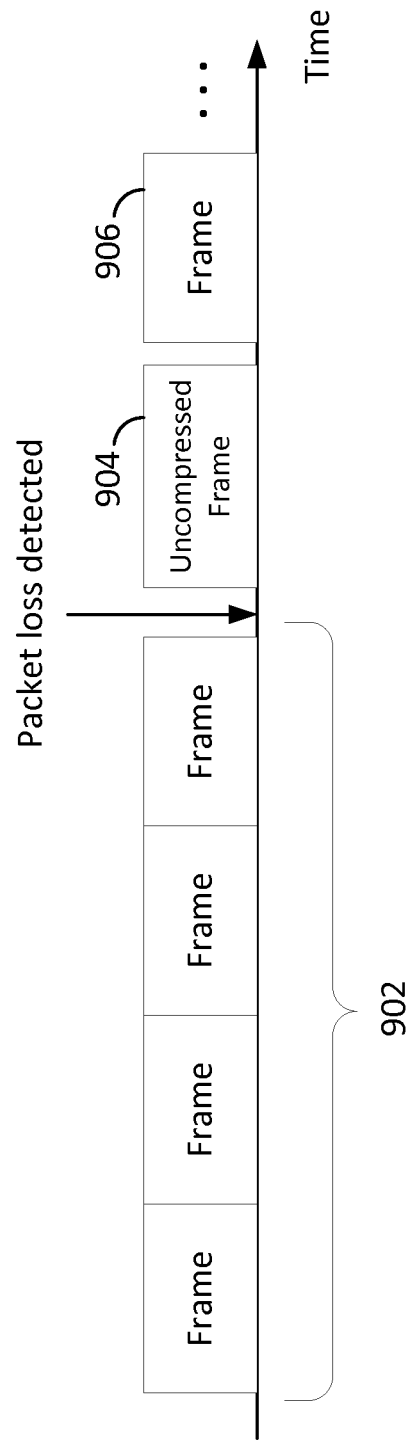
FIG. 9 is a conceptual diagram illustrating a modem information based rate adaptation process for transmitting an uncompressed video frame in response to packet loss detection in accordance with an aspect of the disclosure.

In an aspect of the disclosure, when the sending UE receives packet loss information from the modem, the video codec (e.g., codec 605, 611, 705, or 711) responds immediately or rapidly by transmitting an uncompressed video frame (block 808). Referring to FIG. 9, for example, the sending UE transmits a number of video frames 902 to a receiving UE. In general, a video frame may reference to any of the previous video frames. In response to the detection of packet loss based on modem information, the sending UE may transmit an uncompressed video frame 904. In a further aspect of the disclosure, the video codec will ensure that all frames 906 transmitted subsequent to the transmission of the uncompressed video frame 904 refrain from referencing the frames 902 prior to the uncompressed frame 904. This may reduce the duration of visual artifacts that result from frame or packet losses.

A method for estimating an uplink channel capacity or bandwidth in a UMTS network is disclosed in a copending U.S. patent application Ser. No. 13/611,297. The entire content of this copending application is incorporated herein by reference. In an aspect of the disclosure, as discussed in detail in the copending application Ser. No. 13/611,297, an uplink (UL) channel available capacity or bandwidth can be estimated by summing the data capacities of individual transmission time intervals (TTI) over a period of time that corresponds to a transmit window length. When there is no transmission in a current TTI, the TTI data capacity may equal zero. In the case where the UE made its first transmission attempt in the current TTI, the TTI data capacity value may depend on whether the UE successfully transmitted data (e.g., the transmitted data prompts a corresponding acknowledgement message (ACK) to be generated at a receiving device, such as a Node B, RNC, or other network entity, and transmitted to the UE). For example, when the UE transmits data correctly (e.g., the UE receives an ACK) the TTI data capacity may be represented as:

$$TTI \text{ Data Capacity} = \frac{\min(MaxDataPerGrant, MaxDataPerHeadroom)}{1 + \text{Number of Retransmissions}}$$

where MaxDataPerGrant is a maximum amount of data that could have been transmitted in the TTI as governed by the serving grant from the network in that TTI, MaxDataPerHeadroom is a maximum amount of data that could have been transmitted in the TTI as governed by the headroom limit, and the Number of Retransmissions is the number of retransmissions the UE went through before successfully completing the transmission.

In a further aspect of the disclosure, an uplink channel capacity estimation is computed at a given time t by applying an algorithm over a time period T immediately preceding t. In an example, T is equal to the length of a predetermined window length parameter L, which may correspond to a transmission window length for the UE. In other words, it can be shown that T=(t−L, t). In an aspect of the disclosure, the uplink channel capacity can be estimated by the equation below to estimate the uplink channel capacity at time t. The following equation may be applied for the time period T:

$$UL \text{ Channel Capacity Estimate } (t) = \frac{\sum_{Relevant\ TTIs\ in\ T} TTI \text{ Data Capacity}}{\text{Total Time Occupied by Relevant } TTIs}$$

Therefore, as represented by the above equation, an uplink channel capacity estimation at t can be realized by summing the TTI data capacities at all relevant TTIs over T and dividing that sum by the total amount of time occupied by the relevant TTIs. In an aspect of the disclosure, a TTI may be considered relevant where there exists data awaiting transmission during the TTI, or data is transmitted or retransmitted during the TTI.

The VT rate adaptation algorithm and processes disclosed herein may be applied in various wireless networks. For example, in an EVDO network, a list of API outputs from a modem of an access terminal may be utilized to detect congestion and determine uplink and downlink available bandwidth. The API includes, for example, cost of modem power, forward link (FL) data rate, reverse link (RL) data rate, RL radio link protocol (RLP) queue length, FL Pilot Strength Ec/Io, etc.

Figure 10:
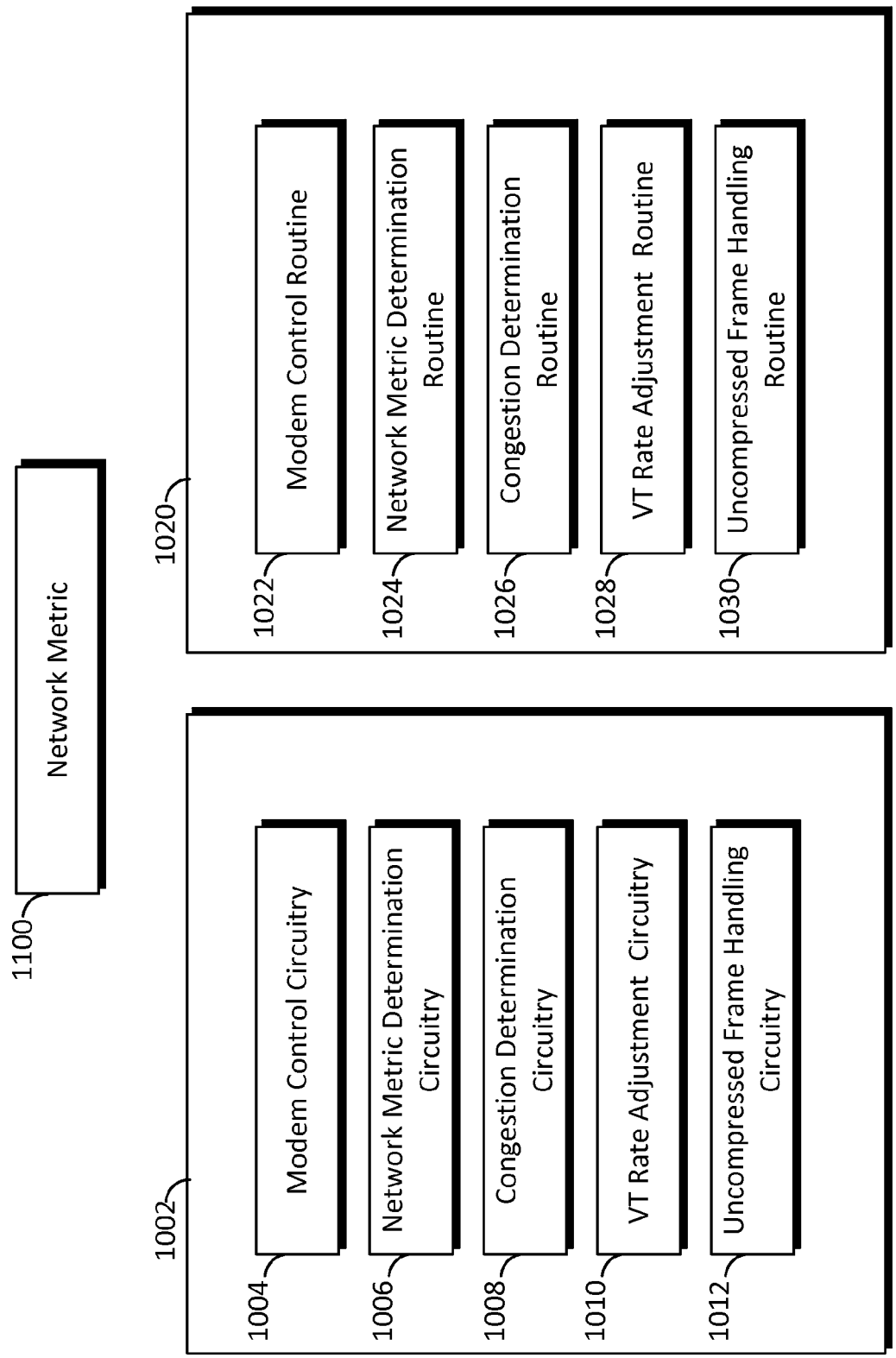
FIG. 10 is a block diagram conceptually illustrating a processor and a storage medium configured to perform modem information based rate adaptation in accordance with aspects of the disclosure.

FIG. 10 is a block diagram conceptually illustrating a processor 1002 and a storage medium 1010 configured for VT application in accordance with aspects of the disclosure. The processor 1002 may be the processor 104 of a UE, and the storage medium 1010 may be the computer-readable medium 106. The processor 1002 includes a modem control circuitry 1004, a network metric determination circuitry 1006, a congestion determination circuitry 1008, a VT rate adjustment circuitry 1010, and an uncompressed frame handling circuitry 1012.

The modem control circuitry 1004 may be used to control, receive and process modem information from a modem (e.g., modem 606) at a UE via a modem API (e.g., API 634). The network metric determination circuitry 1006 may be used to determine a network metric 1100 based on the modem information received from the modem. The network metric 1100 may include uplink bandwidth, downlink bandwidth, packet loss, uplink queue length, etc. The network metric 1100 may be stored in a suitable memory/storage of the UE (e.g., the memory 105 or computer-readable medium 106). The congestion determination circuitry 1008 may be used to determine congestion in the data path based on the current data rate of the VT application and uplink/downlink bandwidth. A congestion is detected if the available bandwidth is less than the current data rate.

The VT rate adjustment circuitry 1010 may be used for adjusting the data rate of VT communication based on the modem information in accordance with the processes described in FIGS. 6-9. The uncompressed frame handling circuitry 1012 may be used to insert an uncompressed frame (e.g., frame 904 in FIG. 9) in the VT communication in accordance with packet loss information of the network metric, and ensure that all subsequent frames refrain from referencing the frames prior to this uncompressed frame.

The storage medium 1020 includes a modem control routine 1022, a network metric determination routine 1024, a congestion determination routine 1026, a VT rate adjustment routine 1028, and an uncompressed frame handling routine 1030. The UE may execute the modem control routine 1022 to configure the modem control circuitry 1004 for receiving and processing modem information received from a modem (e.g., modem 606) at a UE. The UE may execute the network metric determination routine 1024 to configure the network metric determination circuitry 1006 to determine the network metric based on the modem information. The UE may execute the congestion determination routine 1026 to configure the congestion determination circuitry 1008 to determine network congestion. The UE may execute the VT rate adjustment routine 1028 to configure the VT rate adjustment circuitry 1010 for adjusting the data rate of VT communication based on the modem information in accordance with the processes described in FIGS. 6-9. The UE may execute the uncompressed frame handling routine 1030 to configure the uncompressed frame handling circuitry 1012 for inserting an uncompressed video frame (e.g., frame 904 in FIG. 9) in VT communication in response to packet loss information of the modem information, and ensuring that all subsequent frames refrain from referencing the video frames prior to this uncompressed frame.

Figure 11:
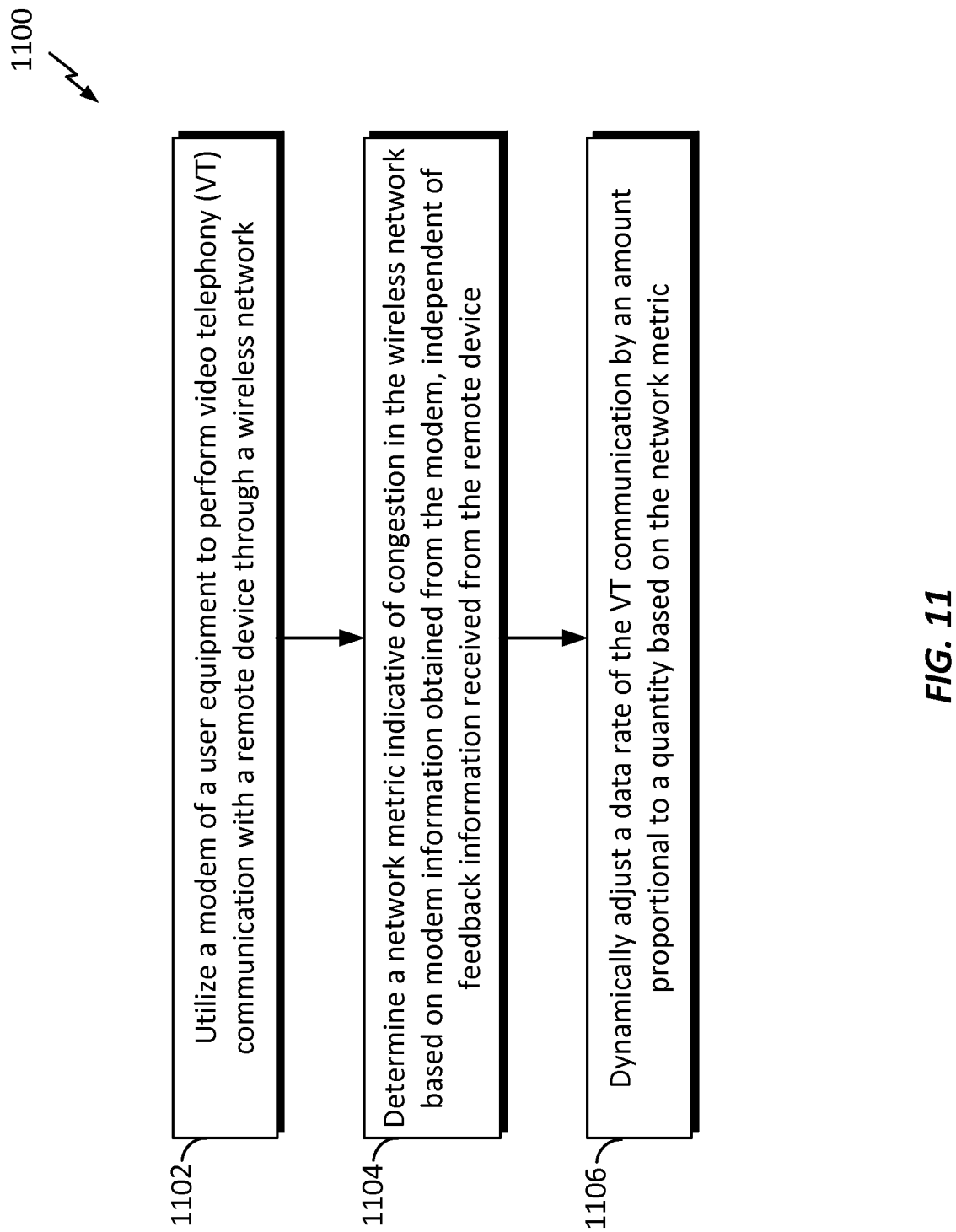
FIG. 11 is a flowchart illustrating a method of performing VT communication rate adaptation based on modem information in accordance with an aspect of the disclosure.

FIG. 11 is a flowchart illustrating a method 1100 of performing video telephony (VT) communication rate adaptation based on modem information in accordance with an aspect of the disclosure. The method 1100 may be performed with the UE 602 or 702. The UE utilizes a modem to perform VT communication with a remote device (e.g., a remote UE 608) through a wireless network (e.g., UTRAN 202) (see block 1102). The UE determines a network metric indicative of congestion in the wireless network based on modem information obtained from the modem, independent of feedback information received from the remote device (see block 1104). In an aspect of the disclosure, the UE may execute the modem control routine 1012 to configure the modem control circuitry 1004 for performing the functions described in blocks 1102 and 1104. Further, the UE dynamically adjusts a data rate of the VT communication by an amount proportional to a quantity based on the network metric (see block 1106). In an aspect of the disclosure, the UE may execute the VT rate adjustment routine 1014 to configure the VT rate adjustment circuitry 1006 for performing the functions of block 1106. The quantity based on the network metric may be a rate difference between a current data rate of the VT communication and an estimated available uplink bandwidth in the wireless network.

Figure 12:
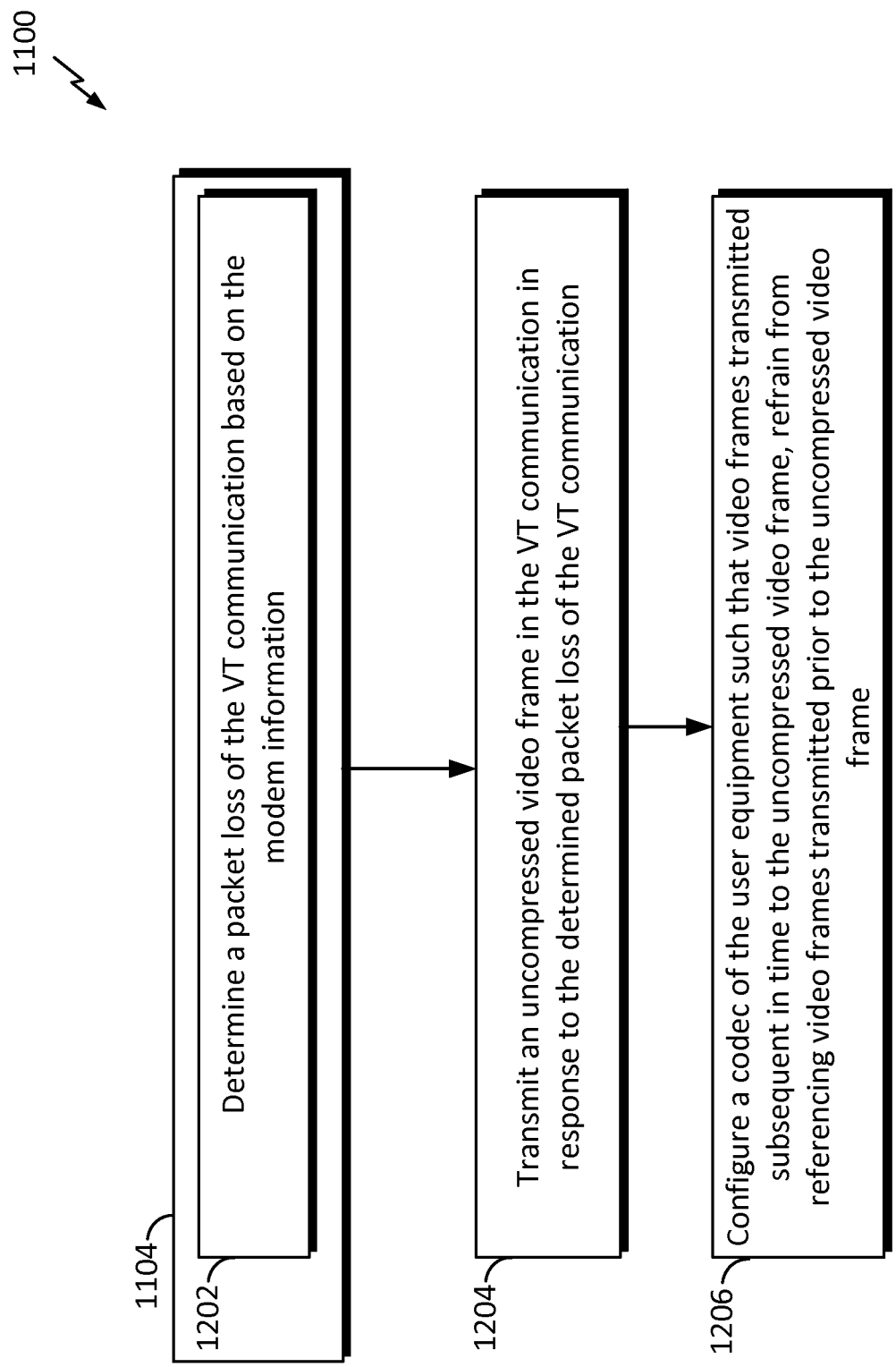
FIG. 12 is a flowchart illustrating additional detail of the method of FIG. 11 in accordance with an aspect of the disclosure.

FIG. 12 is a flowchart illustrating additional detail of the method 1100 in accordance with an aspect of the disclosure. The UE determines a packet loss of the VT communication based on the modem information (see block 1202). If packet loss occurs, the UE transmits an uncompressed video frame (e.g., uncompressed video frame 904) in the VT communication in response to the determined packet loss (see block 1204). Then, the UE configures a video codec (e.g., codec 605, 611, 705, or 711) such that video frames transmitted subsequent in time to the uncompressed video frame, will refrain from referencing video frames transmitted prior to the uncompressed video frame (see block 1206). In an aspect of the disclosure, the UE may execute the uncompressed frame handling routine 1016 to configure the uncompressed frame handling circuitry 1008 for performing the functions of blocks 1202, 1204, and 1206.

In the above described aspects of the disclosure as illustrated in FIGS. 6-12, the UE adjusts the data rate of the VT communication to utilize the available bandwidth of the wireless link more efficiently, and to reduce visual artifacts that may result from frame or packet losses based on modem information, independent of feedback information received from the remote device.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EVDO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   utilizing a modem of a user equipment to perform video telephony (VT) communication with a remote device through a wireless network;
   determining a network metric indicative of congestion in the wireless network and a packet loss of the VT communication, based on modem information obtained from the modem, independent of feedback information received from the remote device;
   dynamically adjusting a data rate of the VT communication by an amount proportional to a quantity based on the network metric; and
   transmitting an uncompressed video frame in the VT communication in response to the packet loss of the VT communication.

2. The method of claim 1,
   further comprising:
   configuring a codec of the user equipment such that video frames transmitted subsequent in time to the uncompressed video frame, refrain from referencing video frames transmitted prior to the uncompressed video frame.

3. The method of claim 1, wherein the network metric comprises at least one selected from the group consisting of an uplink available bandwidth, a downlink available bandwidth, packet loss information, and an uplink queue length.

4. The method of claim 1, wherein determining the network metric comprises estimating available bandwidth in the wireless network based on the modem information.

5. The method of claim 4, wherein the quantity comprises a rate difference between a current data rate of the VT communication and the estimated available bandwidth in the wireless network.

6. The method of claim 4, wherein the estimated available bandwidth comprises at least one of an estimated uplink available bandwidth or an estimated downlink available bandwidth.

7. The method of claim 1, wherein determining the network metric comprises determining an uplink queue length based on the modem information.

8. An apparatus for wireless communication, comprising:
   means for utilizing a modem of the apparatus to perform video telephony (VT) communication with a remote device through a wireless network;
   means for determining a network metric indicative of congestion in the wireless network and a packet loss of the VT communication, based on modem information obtained from the modem, independent of feedback information received from the remote device;
   means for dynamically adjusting a data rate of the VT communication by an amount proportional to a quantity based on the network metric; and
   means for transmitting an uncompressed video frame in the VT communication in response to the packet loss of the VT communication.

9. The apparatus of claim 8,
   further comprising:
   means for configuring a codec of the apparatus such that video frames transmitted subsequent in time to the uncompressed video frame, refrain from referencing video frames transmitted prior to the uncompressed video frame.

10. The apparatus of claim 8, wherein the network metric comprises at least one selected from the group consisting of an uplink available bandwidth, a downlink available bandwidth, packet loss information, and an uplink queue length.

11. The apparatus of claim 8, wherein the means for determining the network metric comprises means for estimating available bandwidth in the wireless network based on the modem information.

12. The apparatus of claim 11, wherein the quantity comprises a rate difference between a current data rate of the VT communication and the estimated available bandwidth in the wireless network.

13. The apparatus of claim 11, wherein the estimated available bandwidth comprises at least one of an estimated uplink available bandwidth or an estimated downlink available bandwidth.

14. The apparatus of claim 8, wherein the means for determining the network metric comprises means for determining an uplink queue length based on the modem information.

15. A computer program product, comprising:
    a non-transitory computer-readable storage medium comprising code for causing a user equipment (UE) to:
    utilize a modem of the UE to perform video telephony (VT) communication with a remote device through a wireless network;
    determine a network metric indicative of congestion in the wireless network and a packet loss of the VT communication, based on modem information obtained from the modem, independent of feedback information received from the remote device;
    dynamically adjust a data rate of the VT communication by an amount proportional to a quantity based on the network metric; and transmit an uncompressed video frame in the VT communication in response to the packet loss of the VT communication.

16. The computer program product of claim 15, further comprising code for causing the UE to:
configure a codec of the UE such that video frames transmitted subsequent in time to the uncompressed video frame, refrain from referencing video frames transmitted prior to the uncompressed video frame.

17. The computer program product of claim 15, wherein the network metric comprises at least one selected from the group consisting of an uplink available bandwidth, a downlink available bandwidth, packet loss information, and an uplink queue length.

18. The computer program product of claim 15, wherein the code for determining the network metric comprises code for causing the UE to estimate available bandwidth in the wireless network based on the modem information.

19. The computer program product of claim 18, wherein the quantity comprises a rate difference between a current data rate of the VT communication and the estimated available bandwidth in the wireless network.

20. The computer program product of claim 18, wherein the estimated available bandwidth comprises at least one of an estimated uplink available bandwidth or an estimated downlink available bandwidth.

21. The computer program product of claim 15, wherein the code for determining the network metric comprises code for causing the UE to determine an uplink queue length based on the modem information.

22. An apparatus for wireless communication, comprising:
at least one processor;
a communication interface including a modem coupled to the at least one processor; and
a memory coupled to the at least one processor,
wherein the at least one processor comprises:
first circuitry configured to utilize the modem to perform video telephony (VT) communication with a remote device through a wireless network;
second circuitry configured to determine a network metric indicative of congestion in the wireless network and a packet loss of the VT communication, based on modem information obtained from the modem, independent of feedback information received from the remote device;
third circuitry configured to dynamically adjust a data rate of the VT communication by an amount proportional to a quantity based on the network metric; and
fourth circuitry configured to transmit an uncompressed video frame in the VT communication in response to the packet loss of the VT communication.

23. The apparatus of claim 22, further comprising fifth circuitry configured to:
configure a codec of the apparatus such that video frames transmitted subsequent in time to the uncompressed video frame, refrain from referencing video frames transmitted prior to the uncompressed video frame.

24. The apparatus of claim 22, wherein the network metric comprises at least one selected from the group consisting of an uplink available bandwidth, a downlink available bandwidth, packet loss information, and an uplink queue length.

25. The apparatus of claim 22, wherein the second circuitry is further configured to estimate available bandwidth in the wireless network based on the modem information.

26. The apparatus of claim 25, wherein the quantity comprises a rate difference between a current data rate of the VT communication and the estimated available bandwidth in the wireless network.

27. The apparatus of claim 25, wherein the estimated available bandwidth comprises at least one of an estimated uplink available bandwidth or an estimated downlink available bandwidth.

28. The apparatus of claim 22, wherein the second circuitry is further configured to determine an uplink queue length based on the modem information.

* * * * *